United States Patent
Wilensky

(12) 
(10) Patent No.: US 6,298,157 B1
(45) Date of Patent: *Oct. 2, 2001

(54) LOCATING AND ALIGNING EMBEDDED IMAGES

(75) Inventor: Gregg D. Wilensky, San Jose, CA (US)

(73) Assignee: Adobe Systems Incorporated, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/032,718

(22) Filed: Feb. 27, 1998

(51) Int. Cl.$^7$ .................................................. G06K 9/48
(52) U.S. Cl. ............................................................ 382/199
(58) Field of Search .............................. 382/173, 181, 382/182, 183, 176, 184, 185, 190, 193, 194, 195, 196, 107, 198, 202, 199, 200, 209, 210, 203, 211; 395/163, 164; 235/454, 462, 472, 439

(56) References Cited

U.S. PATENT DOCUMENTS

| | | | | |
|---|---|---|---|---|
| 4,926,490 | * | 5/1990 | Mano | 382/9 |
| 5,317,689 | * | 5/1994 | Nack et al. | 395/163 |
| 5,452,374 | * | 9/1995 | Cullen et al. | 382/293 |
| 5,748,783 | * | 5/1998 | Rhoads | 382/232 |
| 5,834,749 | * | 11/1998 | Durbin | 235/454 |
| 6,026,186 | * | 2/2000 | Fan | 382/201 |

FOREIGN PATENT DOCUMENTS

| | | | |
|---|---|---|---|
| 0660256A2 | 6/1995 | (EP) | G06K/9/32 |
| 0703696A2 | 3/1996 | (EP) | H04N/1/387 |
| 0736999A2 | 10/1996 | (EP) | H04N/1/40 |

OTHER PUBLICATIONS

Davies, E.R., "Machine Vision: Theory, Algorithms, Practicalities," Academic Press, pp. 191–207, 241–301.

* cited by examiner

Primary Examiner—Andrew W. Johns
Assistant Examiner—Seyed Azarian
(74) Attorney, Agent, or Firm—Fish & Richardson P.C.

(57) ABSTRACT

Apparatus and methods useful to automate the task of locating a photograph or other image that is embedded within a larger image. An edge curve is found that approximates the perimeter of the embedded image and from the edge curve the rectangle of the embedded image, or a rectangle covering the embedded image, is calculated by processing density profiles of the edge curve taken along two axes. Both location and orientation of an embedded image can be calculated. The location of the four corners of a rectangular embedded image can be calculated, which enables automatic cropping and rotation of the embedded image, even if fewer than all four corners are visible. A rectangle covering the image can be calculated, including a rectangle aligned with the axes of a larger embedding image such as is created when scanning a small photograph on a flatbed scanner. The invention operates well on rectangular images, as well as on images having polygonal and other border shapes, such as circles and ellipses, including images with irregular shapes.

19 Claims, 6 Drawing Sheets

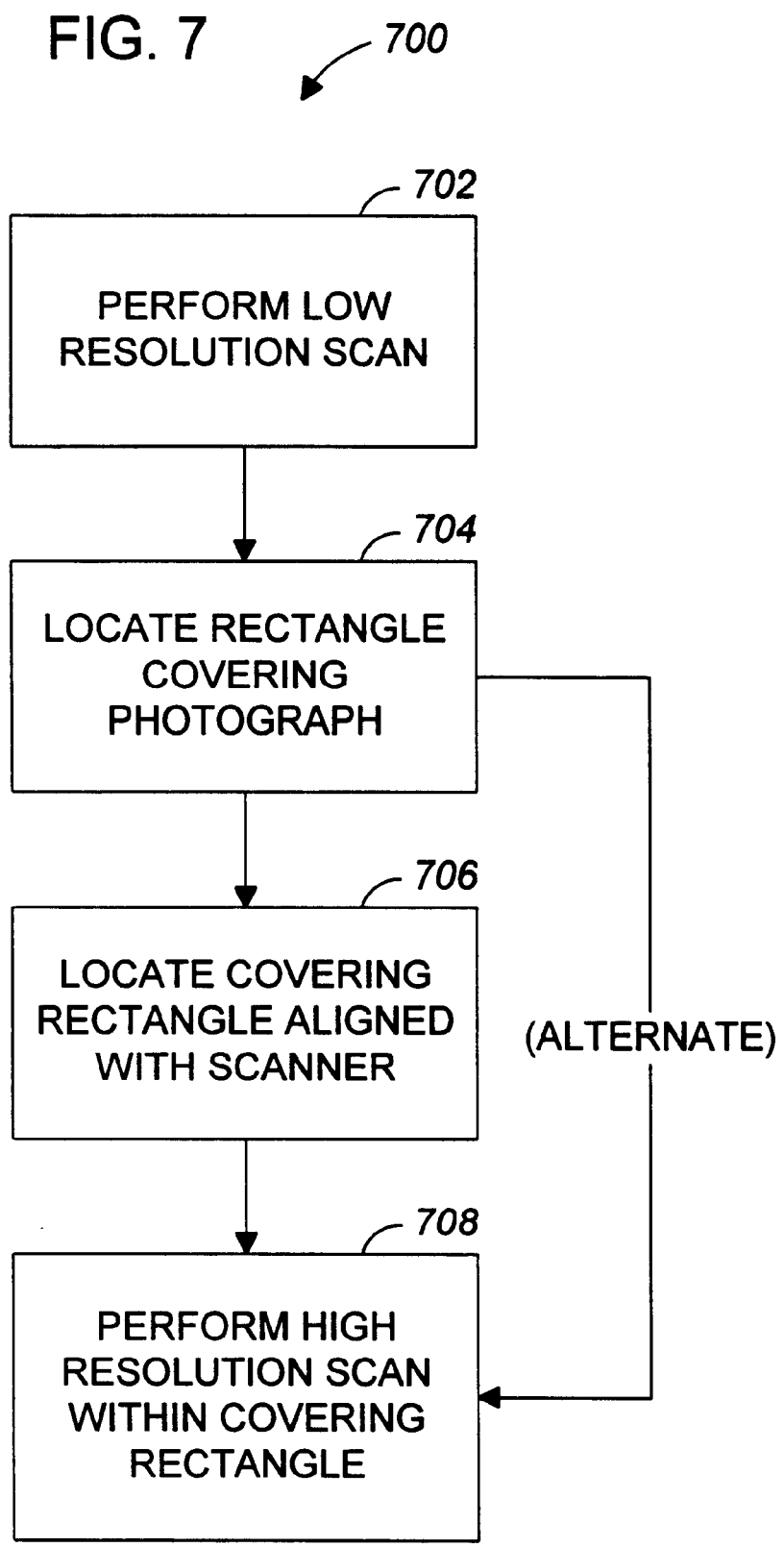

LOCATING AND ALIGNING EMBEDDED IMAGES

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to computer-implemented image processing to find embedded images within raster images.

A common application for scanners is to scan and digitize photographs. Often, the scanned and digitized photograph is smaller than the scanner image size, so it is embedded in a larger digitized image, from which the embedded photograph image will have to be extracted before it is used. Often, too, a photograph placed in a scanner will be tilted with respect to the scanning axes and so the digitized photograph will be somewhat misaligned, requiring that it be rotated as well as cropped from the larger image. The user is generally interested in removing any border around the digitized photograph and rotating the digitized photograph so that it is aligned with horizontal and vertical axes parallel to the edges of the photograph.

SUMMARY OF THE INVENTION

The apparatus and methods of the invention automate the task of locating a photograph or other image that is embedded within a larger image. The invention finds an edge curve that approximates the perimeter of the embedded image and from the edge curve calculates the rectangle of the embedded image or a rectangle covering the embedded image by processing density profiles of the edge curve taken along two axes. The invention can provide both location and orientation of an embedded image. It can provide the location of the four corners of a rectangular embedded image, which enables automatic cropping and rotation of the embedded image, even if fewer than all four corners are visible. It can provide a rectangle covering the image, including a rectangle aligned with the axes of a larger embedding image such as is created when scanning a small photograph on a flatbed scanner. The invention operates well on rectangular images, as well as on images having polygonal and other border shapes, such as circles and ellipses, including images with irregular shapes.

In general, in one aspect, the invention features apparatus for finding an image embedded in a larger image. The apparatus includes means for finding an edge curve of the embedded image in the larger image; means for calculating a rotation angle of the embedded image from the edge curve; and means for calculating from the edge curve a location and orientation of one or more line segments of a side of a rectangle bounding the embedded image in the larger image. Advantageous implementations of the invention include one or more of the following features. Where the embedded image is an image of a rectangular photograph, the apparatus includes means for locating edge segments in the edge curve corresponding to sides of the embedded image in the larger image. The apparatus includes means for locating corners of a covering rectangle of the embedded image. The apparatus includes means for cropping the embedded image in the frame of reference of the larger image. The means for finding an edge curve include means for calculating density profiles on two axes of the larger image; and means for detecting edge points. The apparatus includes means for removing pixel noise from the larger image.

In general, in another aspect, the invention features a method of processing a digital raster image embedded in a larger digital raster image. The method includes finding an edge curve of the embedded image in the larger image; calculating a rotation angle of the embedded image from the edge curve; and calculating from the edge curve a location and orientation of a line segment of a side of a rectangle bounding the embedded image in the larger image. Advantageous implementations of the invention include one or more of the following features. The method includes finding the edge curve by calculating the positions of edge points in the larger image, and scanning from the perimeter into the larger image from starting points on all sides of the larger image and selecting as a point in the edge curve the first edge point encounter from each starting point; calculating a rotation angle by calculating an average angle of the edge curve points over a windowed set of neighboring edge curve points; rotating the edge curve by the complement of the calculated rotation angle; and calculating the location of corners of a rectangle covering the embedded image. The method uses two axes that are perpendicular. The method includes calculating the positions of edge points by applying a Sobel filter to the larger image. The method includes calculating the positions of edge points by applying a Hough transform to the larger image. The method includes cropping the embedded image according the covering rectangle. The method includes removing pixel noise from the larger image before performing the step of finding an edge curve.

Among the advantages of the invention are one or more of the following. Applied to a rectangular embedded image, the invention does not need all four corners of the rectangle to be present in the larger image. The invention is insensitive to noise which may be present in the larger image or the embedded image. The invention can accurately locate the outer boundary of the edge of the embedded image. The invention provides a rotation angle, so the embedded image can be aligned. The invention can be applied to automate the process of scanning in images with flatbed scanners. The invention can be applied to determine whether a photograph is present in a larger image and, if present, where it is.

Other features and advantages of the invention will become apparent from the following description and from the claims.

BRIEF DESCRIPTION OF THE DRAWINGS

FIG. 7 is a flowchart of a method in accordance with the invention implemented in a flatbed scanner.

DETAILED DESCRIPTION

Figure 1:
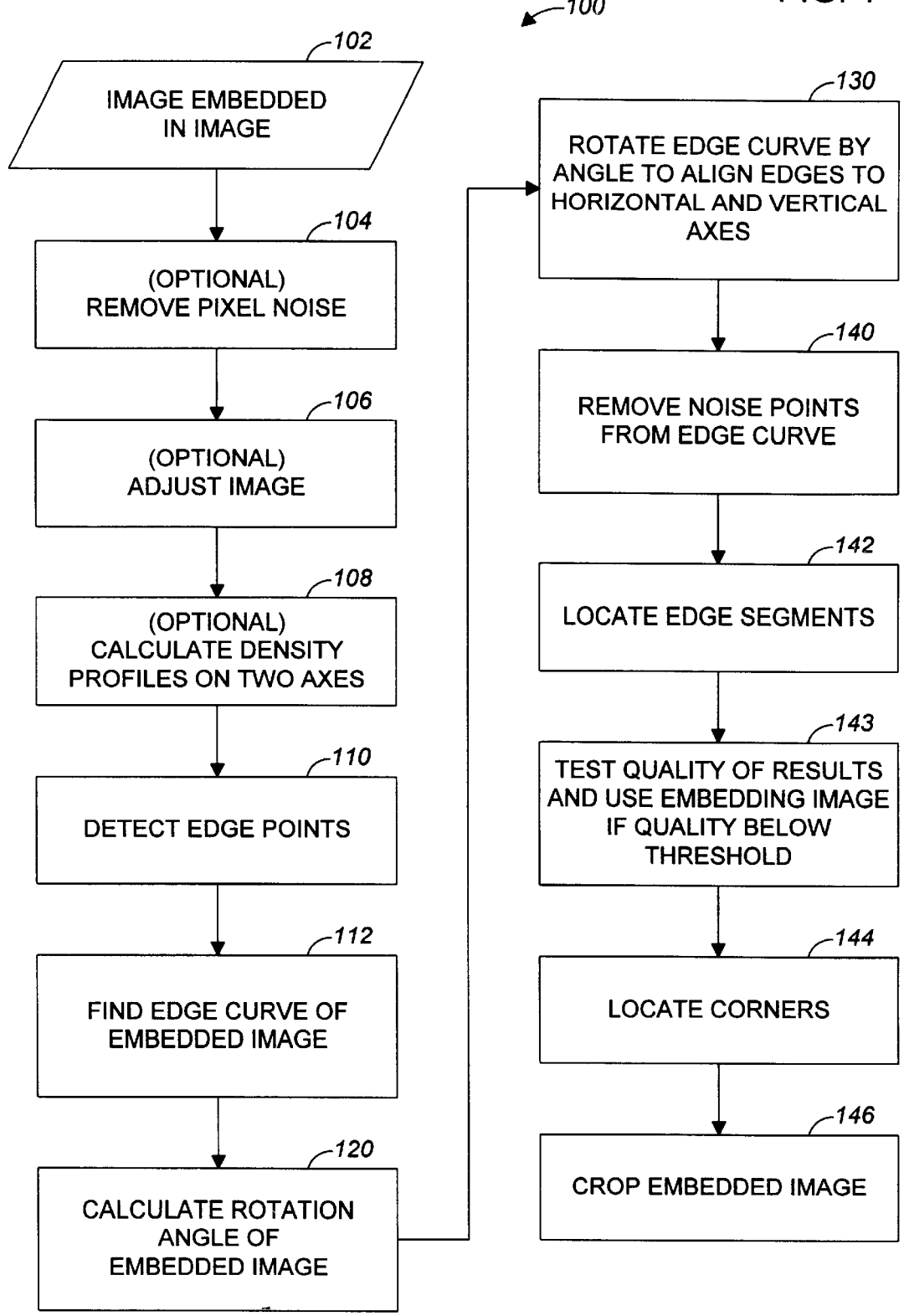
FIG. 1 is a flowchart of a method in accordance with the invention of rotating and cropping an embedded image.

Referring to FIG. 1, a method 100 for locating an embedded image operates on an input 102 that includes a raster image in which an image is embedded. To simplify the terminology, the method will be described in terms of a larger image in which is embedded an image of a photograph. To simplify further, when the meaning is clear, the embedded image of a photograph will simply be referred to as the photograph. The larger image including the photograph may be the output of a scanner. The photograph and the larger image may be gray scale or color.

In an optional initial step, a filter is applied to remove noise (step 104). A mean filter may be used to remove pixel noise, and is advantageous over a median filter for this purpose, because a median filter tends to remove thin lines needed by the remainder of the method.

In another optional initial step, brightness and contrast adjustments are made to the larger image (step 106), for example, using histogram equalization.

The method then optionally computes a density profile along two axes, generally the vertical and horizontal axes of the larger image (step 108). The horizontal density profile is a sum of intensity values for all columns plotted as a function of row; the vertical density profile is a sum of intensity values, I, for all rows, x, plotted as a function of column, y:

$$I(x)=\Sigma_y I(x,y)$$

$$I(y)=\Sigma_x I(x,y)$$

The density profile provides a good estimate of the location of the photograph. The center of mass of each profile provides a coordinate that lies within the photograph as long as the photograph is significantly denser than the surrounding image, which is generally noise from a scanner. The density profile may optionally be used to determine whether the photograph fills the entire image or is missing entirely from the image. The intensity information can optionally also be used at this point to determine whether, for example, there is a photograph on the scanner. In one implementation, if the standard deviation of the intensity of the larger image is less than about 10% of the range of possible intensity values, the method determines that no photograph is present.

The method computes edge points in the image (step 110). Edge points are found by applying a Sobel filter to the image. In other implementations, other edge detection methods can be used. If the results of applying the Sobel filter are thresholded, the resulting edge image is a binary image containing edges in the original image. In particular, the edge image contains the visible outer borders of the photograph. (Visible borders are those that appear in the larger image.) In general, the edge image will also contain spurious points from noise as well as real points from edges within the photograph.

To exclude most of the interior of the photograph, the method calculates the points of an edge curve defining a perimeter of edge points within the borders of the larger image. In one implementation, the edge image is scanned both vertically (one column at a time) and horizontally (one row at a time) from both sides of the edge image. The edge curve is initially an empty list of points, which may be stored in any data structure that preserves the points' order. Proceeding around the perimeter of the image, the first edge intensity value encountered in each scan that is above a threshold level is added to the list of points. This yields a list of points that includes spurious noise points outside the photograph, the boundary points of the photograph, as well as some unwanted points from within the photograph that appear when portions of the photograph boundary do not contain enough contrast against the larger image background. The number of points in the edge curve depends on the image, but is at most the perimeter of the larger image measured in pixels.

Because the edge curve is obtained by traversing the perimeter of the image in a specific order, the points along the edge of the photograph are ordered. That is, as a curve index n increases, neighboring points are generally encountered, with the exception of noise points, along the border of the photograph.

The rotation angle of the photograph (with respect to the axes of the larger image) is calculated (step 120). Using the edge curve, the rotation angle of the photograph can be estimated with an accurate and reliable calculation that is very insensitive to noise. One implementation of such a calculation, which will be referred to as the shape-invariant angle method, or, for a rectangular photograph, the rectangle-invariant angle method.

Figure 2:
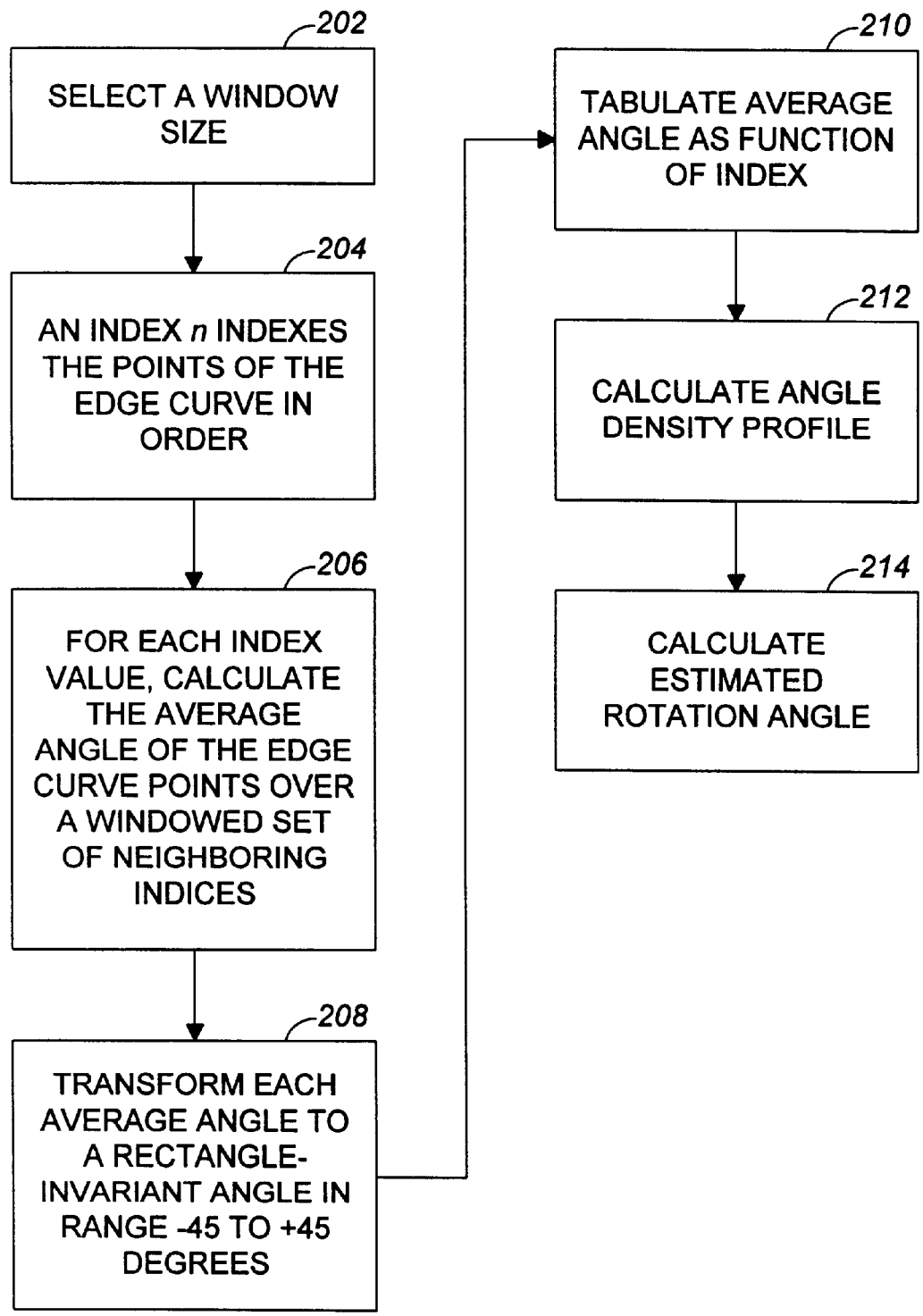
FIG. 2 is a flowchart expanding on a portion of FIG. 1.

FIG. 2 shows the steps of the rectangle-invariant angle method 200 for calculating the photograph rotation angle of a rectangular photograph. In this method, a window size is selected (step 202). This may be predetermined or selected dynamically. An index n indexes the points of the edge curve in their order around the perimeter of the image (step 204). From the ordered edge curve, an average angle is calculated over a windowed set of neighboring indices of the selected size (step 206). The average angle is mapped to a shape-invariant angle (step 208). In the case of a rectangle-invariant angle, the invariant is an angle in the range of −45° to +45°, such that both complementary angles of a rectangle are mapped into the same transformed angle. The original angle is taken to range from −180° to 180° while the invariant angle lies in the range of −45° to +45°. This essentially calculates the original angle modulo 90° offset by 45°.

As the sliding window is moved around the edge curve, the average angle is tabulated as a function of the curve point index n (step 210). This tabulated average angle curve has regions of roughly constant angle and transition regions for the corners and for noise points. In spite of the possible presence of large amounts of noise, the dominant angle can be estimated very accurately. To do this, an angle density profile is calculated (step 212). The angle density profile tabulates the number of occurrences of each angle for the angles in the range of −45° to +45°. This essentially creates a horizontal histogram of the tabulated average angle curve. The histogram bin size may be selected according to the desired accuracy of the calculated angle value. Bin sizes of ½° and 1° have been found suitable. The estimated rotation angle is then calculated (step 214). The peak density in the angle density profile is found and a weighted sum of its nearest neighbors provides an accurate estimate of the rotation angle of the photograph. In one implementation, two nearest neighbors on each side are used.

Figure 3:
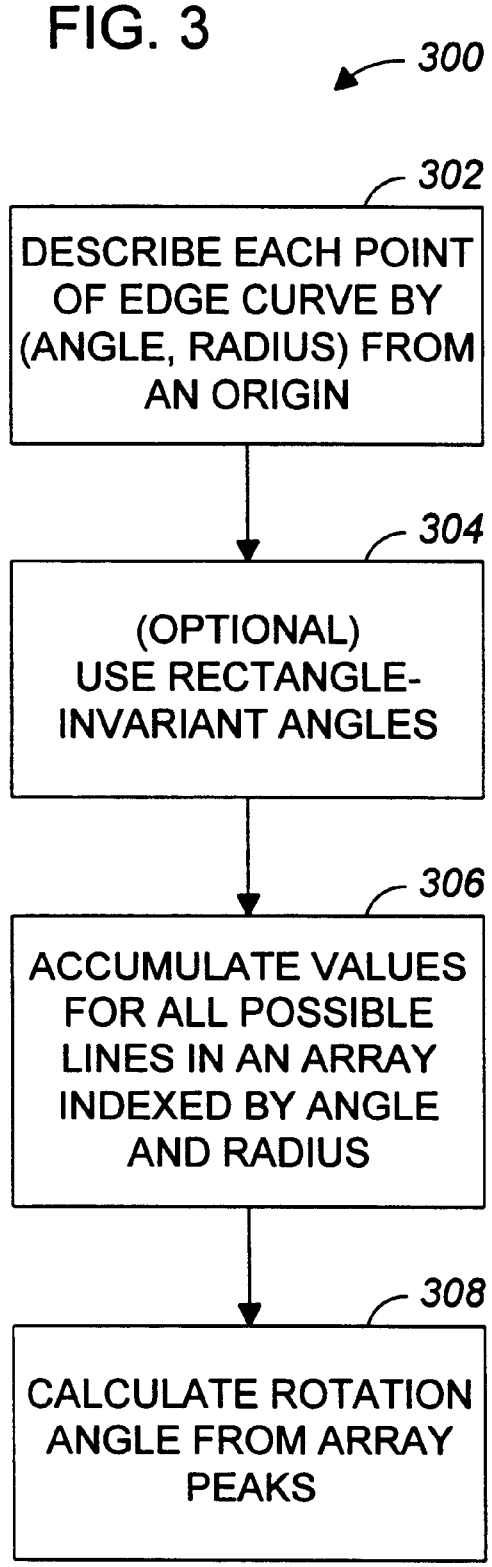
FIG. 3 is a flowchart expanding on a portion of FIG. 1.

FIG. 3 shows the steps of a Hough-transform method 300 for calculating the photograph rotation angle of a rectangular photograph. This method 300 uses the techniques of the Hough transform to locate the positions and angles of the edge segments. This is an alternative method to method 200 (FIG. 2) for implementing step 120 (FIG. 2). Returning to FIG. 3, each point of the edge curve is described by an angle and radius from an origin (step 302). The angles may optionally be a rectangle-invariant angles (step 304). A line perpendicular to the radius arm has the equation:

$$radius=x \cdot cos(angle)+y \cdot sin(angle).$$

The Hough transform accumulates the values for all possible lines in an array indexed by angle and radius (step 306).

Every point in the original edge curve contributes multiple points in the Hough-transformed image. For the present method, the array is index by both the rectangle-invariant angle and the radius (step 306).

By accumulating the values of the in the array for all points in the edge curve, one obtains an array that has one or more peaks—four peaks for a rectangle with four (possibly incomplete) sides showing. Each peak lies at the angle at which a line exists on the original edge curve. With rectangle-invariant angles, each peak lies at the same rectangle-invariant angle, and this, the rotation angle, is calculated from the peak value in the array (step 308). The locations of the line segments of the sides of the visible rectangle can be also optionally be obtained from the corresponding radii using known Hough transform methods. This is an alternative to steps 140–144 of FIG. 1.

As shown in FIG. 1, after the rotation angle has been calculated, the edge curve is rotated by the negative of the calculated angle, which, for a rectangular photograph, aligns the edges with the horizontal and vertical axes of the image and of the computational x-y frame of reference (step 130).

Having calculated the rotation angle, the method removes noise points from the edge curve (step 140). In the absence of noise, the invariant angle (as found, for example, by the mapping used in step 208) of each pair of adjacent points in the edge curve should be oriented close to the rotation angle—or, after rotation of the edge curve, to 0° (invariant). Excluding points that differ too much from this angle will remove unwanted noise and provide a clean edge curve of the border. In one implementation, an angle tolerance of 5° was found to give good results for rectangular photographs and to be a good tradeoff between the loss of boundary points and the inclusion of noise points.

The method now has an edge curve that contains points along the sides of the photograph with each side, in the case of a rectangular photograph, oriented along either the vertical or horizontal axis. Having this edge curve, the method locates the visible portions of the sides of the photograph (step 142). This step operates on the assumption that the visible segments of the sides of the photograph originate from sides of a rectangle. The implementation of this step focuses on line segments rather than corners in order to handle situations in which corners may not be present within the larger image. The larger image may contain all or portions of one, two, three, or four sides of the photograph boundary rectangle. In order to handle all the cases, a two-step procedure is used, as shown in FIG. 4.

Figure 4:
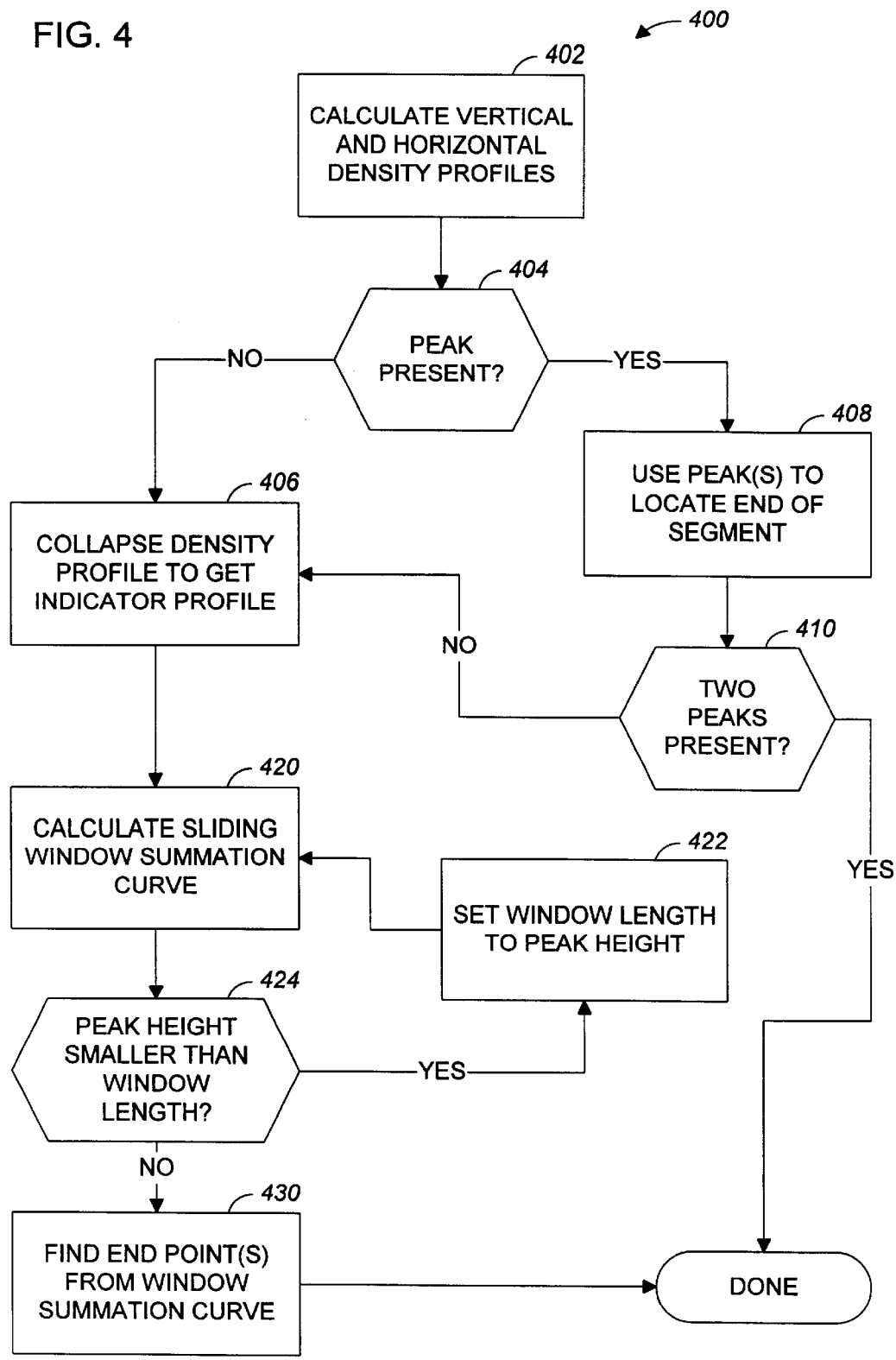
FIG. 4 is a flowchart expanding on a portion of FIG. 1.
Figure 5:
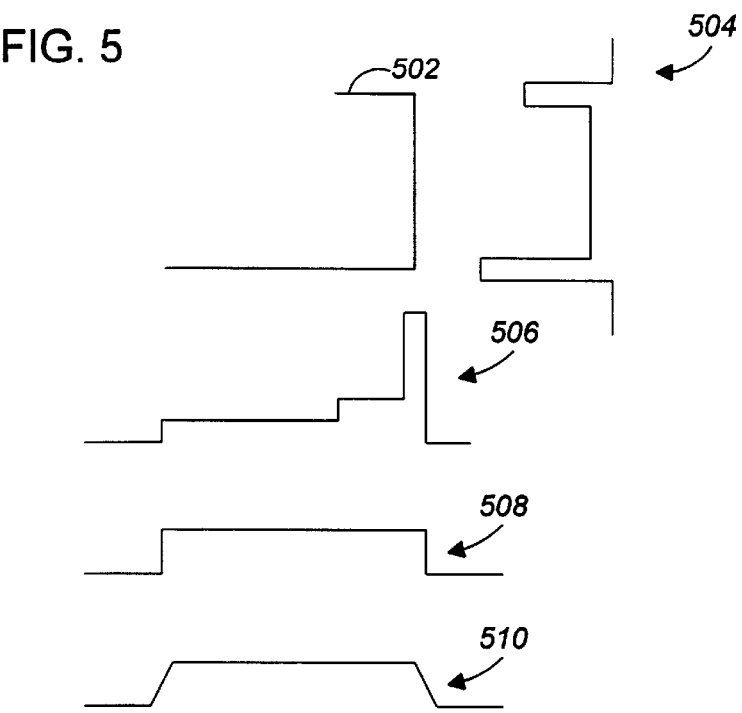
FIG. 5 illustrates the operation of the method shown in FIG. 4.

FIG. 4 shows a method 400 implementing step 142 of FIG. 1. First, horizontal and vertical density profiles of the edge curve are calculated (step 402). For purposes of illustrating method 400, FIG. 5 shows an edge curve 502 for a rectangular photograph that in the process of scanning has lost two corners, a full side and parts of two opposite sides, and density profiles 504 and 506 corresponding to edge curve 502. For each density profile, the following steps are performed.

If a peak is found in a density profile above a threshold level (the yes branch of decision step 404), the location of each peak is used as the location of an end of the segment (step 408). If no peaks are found or only one peak is found (the no branches of decision steps 404 and 410), the density profile is collapsed to give an indicator profile (step 406). An indicator profile has a values that are either 0 or 1, depending on whether the corresponding density profile values are zero or nonzero, respectively. Indicator profile 508 (FIG. 5) is derived collapsed from density profile 506. Use of an indicator profile allows sliding window summation of values to provide a window summation curve (for example, curve 510) from which edge end locations can be calculated.

The method begins with a window length that may be too large and calculates a window summation curve (step 420). The height of the resulting peak is compared to the window length (decision step 424). In general, the larger the window length, the smaller is the sensitivity to noise. If the window length is at least as long as the edge segment, the peak will be as high as the edge segment is long. If the peak height is less than the window length, the window length is set to the peak height (step 422 from the no branch of step 424). The window summation (step 420) is then repeated with the new window height. (In an alternative implementation, the desired window length is half the segment length, so the window length is set to half the peak height in step 422.) The end points are finally calculated by locating the peak in the window summation curve and finding the segment end points at the curve points that have a value equal to half the peak value (step 430), that is, the mid-points of the ramps that can be seen in curve 510 of FIG. 5.

Having located the edge segments, the quality of the results are tested against quality thresholds, which may be predetermined or subject to user selection, to determine whether to use the embedded image that was found or to use the entire, larger image (step 143, FIG. 1). The thresholds may be set to disable this step, so that what was identified as the embedded image is always used. This step is useful, for example, in situations where the image has an area of low contrast at the edge (light sky, for example) and a strong interior edge (such as a horizon). In one quality test, the larger image is partitioned into an inside and an outside of the calculated perimeter of the embedded image. If the standard deviation of the intensity of the outside is above a threshold (for example, if it is above about 10% or about 15% of the range of possible intensity values), or if the standard deviation of the outside exceeds that of the inside, the larger image is used as the result of the method. This result generally occurs when the embedded image is coextensive with the larger image and has a strong interior edge extending through it. In another quality test, which may be combined with the first or used as an alternative, the number of edge points on the calculated edge segments is compared with the maximum possible number of edge points given the combined lengths of the edge segments. If the population of edge points in the combined edge segments is too sparse— for example, less than about 10% or about 15% of the maximum total possible—the entire, larger image is treated as the embedded image and used as the result.

After step 142 or, if it is performed, step 143, the corners are located from the edge end coordinates in the rotated reference frame. Having the rotation angle and the positions of the visible edge segments, the coordinates of the corners of the photograph in the original image can readily be calculated (step 144). (Note that in the case of a photograph that has lost one end of the rectangle, for example, the calculated corners will be those of a smaller rectangle that covers the visible part of the photograph, rather than those of the original physical photograph. However, the smaller covering rectangle is sufficient for all purposes of later computation.)

Having the corner coordinates, operations can be performed on the embedded image. For example, the embedded image can be cropped (step 146).

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

Figure 6:
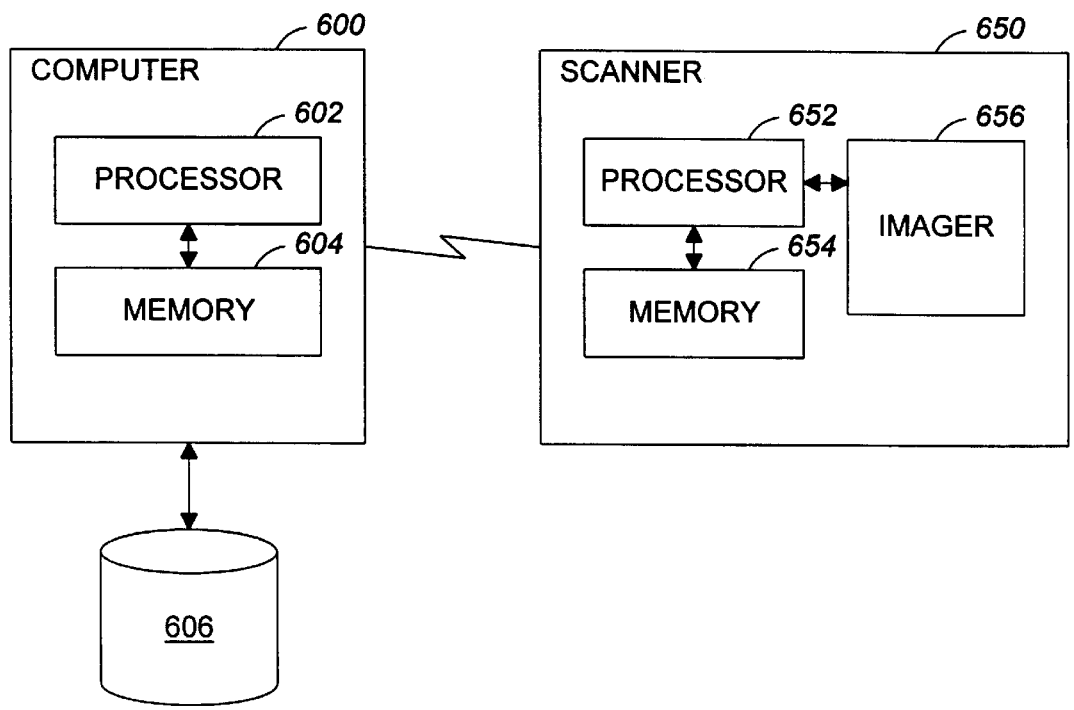
FIG. 6 is a schematic block diagram of apparatus suitable for use of the invention.

By way of example, as shown in FIG. 6, a scanner 650 includes a microprocessor 652 for executing program instructions stored on a random access memory (RAM) 654 and controlling operation of a scanning imager 656, which includes the mechanical and optical elements of the scanner, such as a scanner bed and imaging optics. The scanner may also include a separate program memory such as a writable read-only memory (ROM), for example, a flash ROM.

The scanner may be connected to a computer 600 which includes a processor 602, a random access memory (RAM) 604, a program memory, a hard drive controller, a video controller for a display device, a display device, and an input/output (I/O) controller, coupled to each other by one or more data transfer busses. The computer 600, the scanner 650, or both may be preprogrammed, in ROM, for example, or it may be programmed (and reprogrammed) by loading a program from another source (for example, from a floppy disk, a CD-ROM, or another computer). In this way, the computer and scanner may be configured to perform steps and to be apparatus implementing the techniques described in this specification.

For example, FIG. 7 shows a method 700 implementing these techniques in a flatbed scanner to find and scan an image such as a rectangular photograph on the bed of the scanner. The method can be implemented in the scanner with a programmed microprocessor controlling the scanner, as has been described. The method can be made available to a user as a mode of operation selectable through a user interface of the scanner, which may be presented to a user on a scanner control panel or through a computer program interface created by operation of a program running on a computer that is in communication with the scanner. Method 700 begins by performing a low resolution scan of the photograph. Using the raster image resulting from the scan and applying the techniques described above, the scanner locates a rectangle covering the photograph on the bed of the scanner (step 704). If the scanner can scan at the rotation angle of the photograph, the scanner can scan the covering rectangle at high resolution (step 708). Otherwise, and generally, the location of a generally larger covering rectangle that is aligned with the scanner is calculated (step 706). Then the scanner scans just that portion of the scanner bed that is covered by the covering rectangle (step 708). In this way, a photograph may be scanned at a high resolution to produce a smaller image file than would be produced by a high resolution scan of the entire scanner bed.

It should be noted that the operation of the methods of finding a covering rectangle described are robust and do not require the original embedded image to be rectangular or even regular in shape. The methods of the invention will find a rotation angle even for an irregular shape. The angle found will generally be that of a best, longest line segment on the perimeter of the shape, or of a number of parallel or perpendicular line segments. The rotation of the edge curve of the shape may be arbitrary, in the sense that it does not necessarily orient the shape to place the image in what would be seen as an upright viewing position. Nevertheless, by applying method 400 (described in reference to FIG. 4) a covering rectangle can be computed within which the image, even an irregular image, will be found.

Other embodiments are within the scope of the following claims. For example, the order of performing steps of the invention may be changed by those skilled in the art and still achieve desirable results. The shape of the photograph may be determined dynamically from the edge curve and used to determine dynamically the invariant angle mapping.

What is claimed is:

1. An apparatus for finding an image embedded in a larger image, the apparatus comprising:

edge detecting means for detecting, within the larger image, an edge of the embedded image, the edge including one or more edge points;

edge curve finding means for finding an edge curve from the detected edge of the embedded image, wherein the edge curve finding means compares an intensity value of an edge point of the detected edge to a threshold intensity level and designates edge points having an intensity value exceeding the threshold intensity level as being included in the edge curve, the edge curve defining visible perimeter portions of the embedded image and excluding substantially all interior portions of the embedded image;

rotation angle calculating means for calculating a rotation angle of the embedded image from the edge curve; and line segment calculating means for calculating from the edge curve a location and orientation of one or more line segments of a side of a rectangle bounding the embedded image in the larger image.

2. The apparatus of claim 1, wherein the embedded image is an image of a rectangular photograph, the apparatus further comprising:

edge segment locating means for locating edge segments in the edge curve corresponding to sides of the embedded image in the larger image.

3. The apparatus of claim 1, further comprising:

covering rectangle locating means for locating corners of a covering rectangle of the embedded image.

4. The apparatus of claim 3, further comprising:

cropping means for cropping the embedded image in a frame of reference of the larger image.

5. The apparatus of claim 3, further comprising:

edge point detecting means for detecting edge points.

6. The apparatus of claim 5, further comprising:

noise removing means for removing pixel noise from the larger image.

7. A method of processing a digital raster image embedded in a larger digital raster image, comprising:

detecting, within the larger image, an edge of the embedded image, the edge including one or more edge points;

finding an edge curve from the detected edge of the embedded image by comparing an intensity value of an edge point of the detected edge to a threshold intensity level and designating edge points having an intensity value exceeding the threshold intensity level as being included in the edge curve, the edge curve defining visible perimeter portions of the embedded image and excluding substantially all interior portions of the embedded image;

calculating a rotation angle of the embedded image from the edge curve; and calculating from the edge curve a location and orientation of a line segment of a side of a rectangle bounding the embedded image in the larger image.

8. The method of claim 7, further comprising:

finding the edge curve by:
    calculating the positions of edge points in the larger image; and
    scanning from the perimeter into the larger image from starting points on all sides of the larger image and selecting as a point in the edge curve the first edge point encounter from each starting point;

calculating a rotation angle by calculating an average angle of the edge curve points over a windowed set of neighboring edge curve points;

rotating the edge curve by the complement of the calculated rotation angle; and calculating the location of corners of a rectangle covering the embedded image.

9. The method of claim 8, wherein:

the two axes are perpendicular; and calculating the positions of edge points comprises applying a Sobel filter to the larger image.

10. The method of claim 8, wherein:

the two axes are perpendicular; and calculating the positions of edge points comprises applying a Hough transform to the larger image.

11. The method of claim 8, further comprising:

cropping the embedded image according the covering rectangle.

12. The method of claim 7, further comprising:

removing pixel noise from the larger image before performing the step of finding an edge curve;

finding the edge curve by
    calculating density profiles of the larger image on two axes;
    calculating the positions of edge points in the larger image; and
    scanning from the perimeter into the larger image from starting points on all sides of the larger image and selecting as a point in the edge curve the first edge point encounter from each starting point;

calculating a rotation angle by calculating an average angle of the edge curve points over a windowed set of neighboring edge curve points;

rotating the edge curve by the complement of the calculated rotation angle;

removing noise points from the edge curve; and calculating the location of corners of a rectangle covering the embedded image.

13. The apparatus of claim 3, further comprising:

density profile calculating means for calculating density profiles on two axes of the larger image.

14. The apparatus of claim 1, wherein the embedded image has a non-rectangular border shape.

15. The method of claim 7, wherein:

the larger image is a digital raster image generated by scanning an analog input image.

16. The method of claim 8, further comprising:

performing a scan at a first resolution of a first area to obtain the larger digital raster image; and using the bounding rectangle to define a second area smaller than, and within, the first area, and performing a scan of the second area at a second resolution higher than the first resolution to obtain a raster image including the embedded digital raster image at the second resolution.

17. The method of claim 12, further comprising:

performing a scan at a first resolution of a first area to obtain the larger digital raster image; and using the bounding rectangle to define a second area smaller than, and within, the first area, and performing a scan of the second area at a second resolution higher than the first resolution to obtain a raster image including the embedded digital raster image at the second resolution.

18. The method of claim 17, wherein the scan of the second area is limited to the second area.

19. The method of claim 7, further comprising:

performing a scan at a first resolution of a first area to obtain the larger digital raster image; and using the edge curve to define a second area smaller than, and within, the first area, and performing a scan of the second area at a second resolution higher than the first resolution to obtain a raster image including the embedded digital raster image at the second resolution.

* * * * *